(No Model.)   2 Sheets—Sheet 1.
B. S. CHURCH.
Apparatus for Detecting Leakage or Waste in Water Pipes.
No. 241,619. Patented May 17, 1881.
Fig. 1.
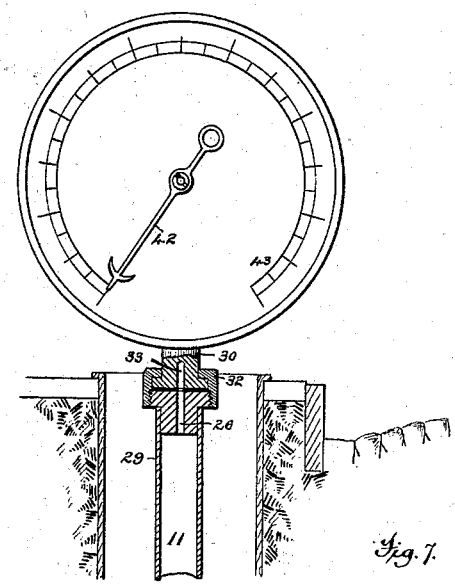
Fig. 2.
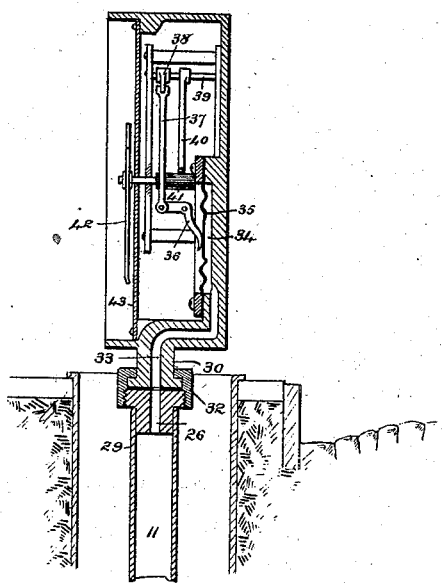
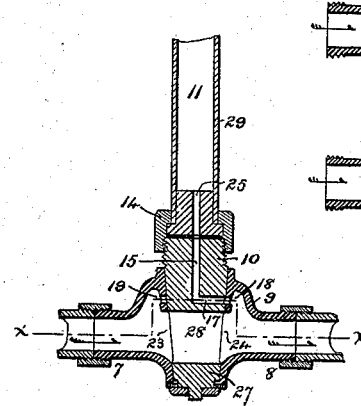
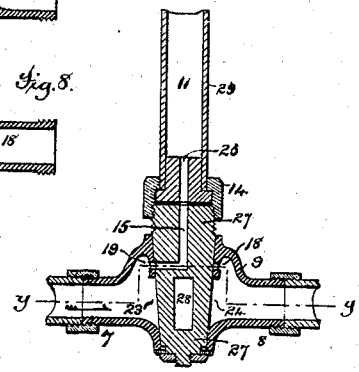
Fig. 3.
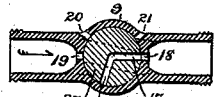
Fig. 5.
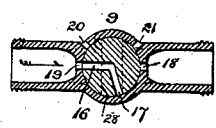
Fig. 4.
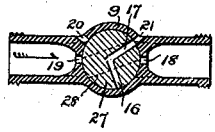
Fig. 6.
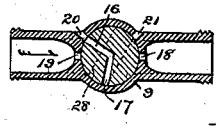
Attest:
Geo. H. Graham
T. H. Palmer
Inventor,
Benj. S. Church,
by Munson & Philipp
Attys.
N. PETERS, Photo-Lithographer, Washington, D. C.

(No Model.)  2 Sheets—Sheet 2.

B. S. CHURCH.
Apparatus for Detecting Leakage or Waste in Water Pipes.

No. 241,619.  Patented May 17, 1881.

Attest:
Geo. H. Graham
T. H. Palmer

Inventor,
Benj. S. Church,
by Munson & Philipp
Attys.

UNITED STATES PATENT OFFICE.

BENJAMIN S. CHURCH, OF SCARBOROUGH, ASSIGNOR TO CHURCH'S WATER WASTE INDICATOR COMPANY, OF NEW YORK, N. Y.

APPARATUS FOR DETECTING LEAKAGE OR WASTE IN WATER-PIPES.

SPECIFICATION forming part of Letters Patent No. 241,619, dated May 17, 1881.

Application filed January 31, 1881. (No model.)

*To all whom it may concern:*

Be it known that I, BENJAMIN S. CHURCH, a citizen of the United States, residing at Scarborough, county of Westchester, and State of New York, have invented certain new and useful Improvements in Methods and Apparatus for Detecting the Rate of Consumption and Leakage of Water, fully described and represented in the following specification and the accompanying drawings, forming a part of the same.

Great waste of water takes place in cities, towns, and villages having water supplied through a system of mains, owing to the negligence of the users, the leaving of faucets and valves open in winter to allow a continual flow of water to prevent the freezing of the pipes, and for other reasons.

The object of my invention is to devise a method and apparatus that can be used by those having charge of such water-supply to give a comparatively accurate knowledge of the rate of consumption of the water, either during day or night, in any building or number of buildings or other place where water is used, and thus detect waste of water without entering the building or other place where it is used; and my invention consists in the method of detecting or determining, through the means substantially hereinafter described, the rate of consumption or waste, by the difference between the dynamical and the statical pressures in the service-pipe leading from the main to the building or other place where water is used, transmitted to an indicating device, and in means for carrying out such method, as will be hereinafter fully described and claimed.

Figure 9:
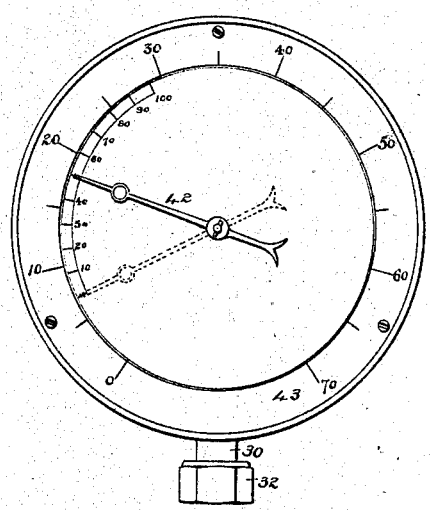
Figure 10:
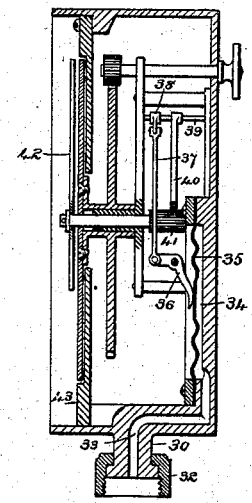

In the drawings, Figure 1 is a vertical section of a means for carrying out my invention, such means being connected to the pipe leading from the main to the building, showing the face of an indicating device and the plug of a cock in a position to permit the dynamical pressure to be transmitted to such indicating device. Fig. 2 is a vertical section of the same, the plug of the cock being in a position to permit the statical pressure to be transmitted to the indicating device. Fig. 3 is a horizontal section taken on the line *x x* of Fig. 1. Fig. 4 is a horizontal section taken on the line *x x* of Fig. 1, the port and ducts in the plug of the cock being in the relation therein shown to the ports and ducts of the shell of the cock for a purpose to be explained. Fig. 5 is a horizontal section on the line *y y* of Fig. 2. Fig. 6 is a horizontal section on the line *y y* of Fig. 2, the port and ducts of the plug of the cock being in the relation therein shown to the ducts and ports of the shell of the cock for a purpose to be explained. Figs. 7 and 8 illustrate a modification of the means shown in Figs. 3, 4, 5, and 6. Figs. 9 and 10 are, respectively, face and a vertical section of a modified form of indicating device.

The arrows in the various figures indicate the direction in which the water flows from the street-main to the place where it is used.

In the drawings a cock is shown, the shell 9 of which being connected at the end 7 with a pipe that leads from the street main, and at the end 8 with a pipe entering the building or other place where the water is used. This shell is provided with ducts 18 19 20 21 and with ports 23 24, all for purposes to be explained. Properly fitting in this shell is a plug, 27, held in place by a screw and nut and spring-washer at the bottom, or in any other well-known manner. This plug 27 is provided with communicating ducts 15, 16, and 17, and also provided with a port, 28, all for purposes to be explained.

29 is a stem provided with a chamber, 11, and ducts 25 26. This stem has connected with it a flanged screw-sleeve, 14, by which it is rigidly coupled to the plug 27, a suitable packing between the stem and plug preventing leakage.

To the upper end of the stem 29 is detachably connected an indicating device, now to be described.

The indicating device is provided with a flanged stem, 30, which through a screw-coupling, 32, is detachably connected to the upper end of the stem 29, the joint between the stem 30 and the stem 29 being suitably packed to prevent leakage. The indicating device may be any well-known form of pressure-gage, with the dial marked to indicate pounds, as usual, or marked to indicate velocity or gallons, after actual trial, of the water flowing per hour.

In the drawings I have shown one form of indicating device which I have found practical. In this form, through the stem 30 and the body of the indicating device, passes a duct, 33, into a chamber, 34, one side of which chamber is formed by a corrugated spring-disk, 35. A pivoted bell-crank lever, 36, communicates motion through a link, 37, crank 38, shaft 39, segmental gear 40, and pinion 41, to an index-hand, 42, secured on the pinion-shaft, which revolves over a dial, 43, upon which is marked a scale with divisions representing the flow of water in gallons per hour, in pounds, or any unit of measure desired, the graduation of this scale being obtained by actual trial.

In using my invention as carried out through the means just described, each service-pipe from the street-main to the house or other place where water is used should be provided with a cock and stem, substantially as above described, the cock being placed under the sidewalk and the stem extending upward to or near the surface of such sidewalk, so that the indicating device can be readily attached and detached near the surface of the pavement, one indicating device thus being capable of use on all the stems, it being carried and in charge of the inspector. To allow water to be used in the building or other place the plug of the cock is turned into the position shown in Fig. 4 of the drawings, the port 28 and the ports 23 24 thus permitting the free flow of water. When it is desired to discover whether water is being used or wasted, and the rate at which it is being used or wasted at any time during the day or night, the indicating device is connected to the stem 29 by the coupling 32. The plug 27 of the cock is then turned by the indicating device and stem 29 until its ducts and ports are in the position shown in Figs. 2 and 5 of the drawings, so that the ducts 16 and 19 coincide. No water can now pass through the port 28, and the full pressure or head of the water, or what I have termed the "statical pressure," is transmitted through the ducts 19 16 15 25 into the chamber 11, where it will compress the air therein, which, being transmitted through the ducts 26 33 to the chamber 34, forces the spring-disk 35 outward, which, through the bell-crank lever 36, link 37, crank 38, shaft 39, segment 40, and pinion 41, will move the index-hand 42 over the dial 43, and when this movement ceases the reading is taken from the dial. The plug 27 is then turned by the indicating device and stem 29 until its ports and ducts are in the position shown in Figs. 1 and 3, the duct 17 coinciding with the duct 18. The water can now pass freely through the port 28 of the plug. If any water is being used in the house or other place, the pressure transmitted through the ducts 18 17 15 25, chamber 11, and ducts 26 33, and which I call the "dynamical pressure," will be less than the statical pressure, and will cause the index-hand to revolve a shorter distance than before. When it has become stationary the reading is taken from the dial, and the difference between the previous reading and this reading will indicate the rate of consumption or waste in pounds, velocity, or gallons, according to the unit of measure marked upon the dial. If no water is being consumed or wasted in the house, the index-hand will point to the same division on the dial as when the first reading was taken, and will be the same as the statical pressure. After the desired readings have been taken the stem 29 is turned until the plug 27 is in the position shown in Fig. 4 of the drawings, when the water that may have passed through the ducts 15 25 into the chamber 11 can escape through the ducts 17 and 21, and thus prevent any accident from freezing when the indicating device is removed and applied to another stem on another service-pipe. The water can then pass freely through the plug of the cock.

If it is desired to turn off the water after having taken the readings, as before described, the stem 29 is turned until the ducts and port in the cock are in the position shown in Fig. 6 of the drawings, when the water that may have passed into the ducts 15 25 and chamber 11 can escape through the ducts 16 20, and thus prevent any accident from freezing.

It is obvious that the indicating device can be connected to the stem 29 by any convenient device, as by a bayonet-coupling or other well-known coupling, and that the stem 29 can be connected to the plug 27 by other means than those shown, or be made a part of such plug, without departing from my invention.

Although I prefer to employ the chamber 11 in the stem 29, it can be dispensed with, and a mere passage-way made for the water to the indicating device. I prefer, however, to use the chamber, as by it the water is prevented from entering the indicating device, and is also forced out by the depressed air when the plug is turned, as in Figs. 4 and 6.

Instead of the two ducts 16 and 17, one duct, as 44, can be employed, the ducts 18, 19, 20, and 21 being arranged as shown in Figs. 7 and 8 of the drawings, the statical pressure being obtained by turning the plug 27 until the duct 44 coincides with the duct 19, and the dynamical pressure by turning the cock until the duct 44 coincides with the duct 18. In the first position the port 28 will be closed, and in the second open, as indicated by the dotted lines. This arrangement of the duct 44 with the port 28 and ducts 18 19, I regard as the equivalent of that shown in Figs. 1 to 6, inclusive, of the drawings.

To avoid computation from the two readings the dial may have a scale of pounds upon it and a movable dial be placed over it capable of being operated through a thumb-screw, pinion, and gear-wheel, upon which second dial is a scale of gallons. When the index-hand has been turned to the point that indicates the dynamical pressure, where it is shown in dotted lines, this second dial is turned, as shown in the drawings, until the zero is opposite the said hand. When the index-hand is turned by the transmission of the statical pressure, as shown in full lines, it will point to the number of gallons that are being used on said second dial. By this means pressure can also be taken.

Having thus described my invention, what I claim as new, and desire to secure by Letters Patent, is—

1. The method of detecting or determining the waste or consumption of water through the means substantially as described, by the difference between the dynamical and statical pressure transmitted to an indicating device, substantially as described.

2. In a cock, the combination of a shell provided with ports 18 19 23 24, and a plug provided with a port, 28, and with ducts 15, 16, and 17, substantially as described.

3. In a cock, the combination of a shell with ducts 18 19 20 21, and with ports 23 24, and a plug provided with a port, 28, and with ducts 15, 16, and 17, substantially as described.

4. The combination, with a cock the shell of which is provided with ports 23 24 and ducts 18 19, and a plug provided with a port, 28, and ducts 15, 16, and 17, of a stem having a chamber, 11, and an indicating device, substantially as described.

5. The combination, with a cock the shell of which is provided with ports 23 24 and ducts 18 19 20 21, and a plug provided with a port, 28, and ducts 15, 16, and 17, of a stem having a chamber, 11, and an indicating device, substantially as described.

6. The combination, with a cock the shell of which is provided with ports 23 24 and ducts 18 19, of a plug provided with ducts 15, 16, and 17, and an indicating device, substantially as described.

7. An indicating device having two dials, combined with means for transmitting statical and dynamical pressure, substantially as described.

In testimony whereof I have hereunto set my hand in the presence of two subscribing witnesses.

BENJ. S. CHURCH.

Witnesses:
T. H. PALMER,
GEO. H. GRAHAM.